United States Patent
Ampulski

[19]

[11] Patent Number: 6,099,781
[45] Date of Patent: Aug. 8, 2000

[54] PAPERMAKING BELT AND PROCESS AND APPARATUS FOR MAKING SAME

[75] Inventor: Robert Stanley Ampulski, Fairfield, Ohio

[73] Assignee: The Procter & Gamble Company, Cincinnati, Ohio

[21] Appl. No.: 09/134,186

[22] Filed: Aug. 14, 1998

[51] Int. Cl.$^7$ ........................................................ B27N 3/10
[52] U.S. Cl. .................. 264/257; 264/259; 264/271.1; 264/279; 162/351
[58] Field of Search ............................. 162/351; 264/257, 264/259, 271.1, 279

[56] References Cited

U.S. PATENT DOCUMENTS

| | | |
|---|---|---|
| 4,111,634 | 9/1978 | Limbach et al. . |
| 4,514,345 | 4/1985 | Johnson et al. . |
| 4,528,239 | 7/1985 | Trokhan . |
| 4,529,480 | 7/1985 | Trokhan . |
| 4,543,225 | 9/1985 | Beaujean . |
| 4,637,859 | 1/1987 | Trokhan . |
| 5,098,522 | 3/1992 | Smurkoski et al. . |
| 5,260,171 | 11/1993 | Smurkoski et al. . |
| 5,275,700 | 1/1994 | Trokhan . |
| 5,328,565 | 7/1994 | Rasch et al. . |
| 5,334,289 | 8/1994 | Trokhan et al. . |
| 5,364,504 | 11/1994 | Smurkoski et al. . |
| 5,431,786 | 7/1995 | Rasch et al. . |
| 5,496,624 | 3/1996 | Stelljes, Jr. et al. . |
| 5,500,277 | 3/1996 | Trokhan et al. . |
| 5,514,523 | 5/1996 | Trokhan et al. . |
| 5,529,664 | 6/1996 | Trokhan et al. . |
| 5,554,467 | 9/1996 | Trokhan et al. . |
| 5,566,724 | 10/1996 | Trokhan et al. . |
| 5,624,790 | 4/1997 | Trokhan et al. . |
| 5,628,876 | 5/1997 | Ayers et al. . |
| 5,679,222 | 10/1997 | Rasch et al. . |
| 5,714,041 | 2/1998 | Ayers et al. . |

FOREIGN PATENT DOCUMENTS

| | | |
|---|---|---|
| WO 86/05220 | 9/1986 | WIPO . |
| WO 99/35332 | 7/1999 | WIPO . |

*Primary Examiner*—Christopher Raimund
*Attorney, Agent, or Firm*—Vladimir Vitenberg; Larry L. Huston; Donald E. Hasse

[57] ABSTRACT

The invention comprises a method for applying a curable resin to a reinforcing structure and an apparatus therefor. The apparatus comprises a working surface having a pattern of recesses therein structured and designed to at least partially receive a reinforcing structure, a means for disposing the reinforcing structure in the pattern of recesses of the working surface, a means for applying a fluid resinous material to the reinforcing structure disposed in the recesses of the working surface, and a means for solidifying the fluid resinous material to provide a patterned resinous framework joined to the reinforcing structure. The process comprises the steps of at least partially disposing the reinforcing structure in the recesses of a working surface, applying the fluid resinous material to the reinforcing structure, and then solidifying the fluid resinous material to form a patterned resinous framework joined to the reinforcing structure. Preferably, the reinforcing structure has voids, penetrable by the fluid resinous material, intermediate the first and second sides, and the resinous material occupies at least some of the voids in the reinforcing structure. The finished belt comprises a patterned resinous framework joined to the reinforcing structure such that a substantial portion of a bottom side of the resinous framework is between two opposite sides of the reinforcing structure.

13 Claims, 3 Drawing Sheets

PAPERMAKING BELT AND PROCESS AND APPARATUS FOR MAKING SAME

FIELD OF THE INVENTION

The present invention relates to processes for making papermaking belts. More particularly, the present invention is concerned with a method of making a belt comprising a reinforcing structure and a resinous framework joined thereto.

BACKGROUND OF THE INVENTION

Generally, through-air-drying papermaking processes include several steps. An aqueous dispersion of papermaking fibers is formed into an embryonic web on a foraminous member, such as Fourdrinier wire. This embryonic web is associated with a deflection member having a macroscopically-planar, and preferably non-randomly patterned network surface which defines within the deflection member a plurality of fluid-permeable deflection conduits. In a continuous papermaking process, this deflection member is in the form of an endless papermaking belt. If the patterned network surface of the deflection member is substantially continuous, the plurality of deflection conduits comprises discrete conduits isolated from one another. If the patterned network surface of the deflection member comprises a plurality of isolated from one another protuberances, the plurality of conduits form a substantially continuous area. The papermaking fibers are deflected into the deflection conduits, and water is removed through the deflection conduits, thereby an intermediate web is formed. The intermediate web is then dried and, if desired, is foreshortened by creping.

The papermaking belt comprising the deflection member is described in several commonly-assigned U.S. Patents: U.S. Pat. No. 4,514,345, issued Apr. 30, 1985 to Johnson et al.; U.S. Pat. No. 4,528,239, issued Jul. 9, 1985 to Trokhan; U.S. Pat. No. 5,098,522, issued Mar. 24, 1992; U.S. Pat. No. 5,260,171, issued Nov. 9, 1993 to Smurkoski et al.; U.S. Pat. No. 5,275,700, issued Jan. 4, 1994 to Trokhan; U.S. Pat. No. 5,328,565, issued Jul. 12, 1994 to Rasch et al.; U.S. Pat. No. 5,334,289, issued Aug. 2, 1994 to Trokhan et al.; U.S. Pat. No. 5,431,786, issued Jul. 11, 1995 to Rasch et al.; U.S. Pat. No. 5,496,624, issued Mar. 5, 1996 to Stelljes, Jr. et al.; U.S. Pat. No. 5,500,277, issued Mar. 19, 1996 to Trokhan et al.; U.S. Pat. No. 5,514,523, issued May 7, 1996 to Trokhan et al.; U.S. Pat. No. 5,554,467, issued Sep. 10, 1996, to Trokhan et al.; U.S. Pat. No. 5,566,724, issued Oct. 22, 1996 to Trokhan et al.; U.S. Pat. No. 5,624,790, issued Apr. 29, 1997 to Trokhan et al.; U.S. Pat. No. 5,628,876 issued May 13, 1997 to Ayers et al.; U.S. Pat. No. 5,679,222 issued Oct. 21, 1997 to Rasch et al.; and U.S. Pat. No. 5,714,041 issued Feb. 3, 1998 to Ayers et al., the disclosures of which patents are incorporated herein by reference.

Deflection of the papermaking fibers into the deflection conduits of the deflection member can be induced by, for example, application of differential fluid pressure to the embryonic web. One preferred method of applying the differential pressure comprises exposing the embryonic web to a vacuum through the deflection conduits of the deflection member. A sudden application of the differential fluid pressure to the fibers tends to separate some of the fibers deflected into the deflection conduits from the web and from one another. In addition, as a result of a sudden application of the pressure differential to the web, a certain number of partially dewatered fibers separated from the embryonic web could completely pass through the conduits of the deflection member. These phenomena cause formation of so-called "pinholes" in the finished paper web, and also may lead to clogging of the vacuum dewatering machinery with the fibers separated from the web.

This undesirable creation of the pinholes may be mitigated by providing a leakage between the deflection member and the papermaking equipment creating the fluid pressure differential. One way of creating such a leakage comprises providing surface texture irregularities in the backside network of the deflection member. Commonly-assigned U.S. Patents Nos.: U.S. Pat. No. 5,098,522 issued Mar. 24, 1992 to Smurkoski et al.; and U.S. Pat. No. 5,364,504 issued Nov. 15, 1994 to Smurkoski et al. disclosed a process of making a backside textured belt, comprising casting a photosensitive resinous material over and through a reinforcing structure while the reinforcing structure travels over a textured working surface. Commonly-assigned U.S. Pat. No. 5,275,700, issued Jan. 4, 1994 to Trokhan et al. disclosed a process of making a backside textured belt, comprising applying a coating of a photosensitive resin to the reinforcing structure and pressing the reinforcing structure into a deformable surface so that the deformable surface forms protrusions which exclude resin from certain areas, thereby creating a textured backside of the belt. Commonly-assigned U.S. Pat. No. 5,334,289 issued Aug. 2, 1994 to Trokhan et al. discloses a process for making a backside textured belt, comprising applying a coating of photosensitive resin to a reinforcing structure which has opaque portions, and then exposing the resin to curing radiation through the reinforcing structure. The foregoing patents are incorporated herein by reference.

Another way of mitigating the undesirable creation of the pinholes, developed by the present assignee, comprises making the belt having deflection conduits such that a substantial portion of each conduit is not less than about 45 mils in each of the conduit's dimensions (measured in the general plane of the belt, i. e., an X-Y plane), as disclosed in commonly-assigned U.S. Pat. No. 5,679,222 issued Oct. 21, 1997 to Rasch et al., which is incorporated herein by reference.

Still, the search for improved products has continued.

The present invention provides a novel process for making an improved papermaking belt comprising a reinforcing structure and a resinous framework joined thereto. It is a benefit of the present invention to provide a novel process for making a backside-textured papermaking belt. Another benefit of the present invention is that it provides a novel process for making a papermaking belt in which the depth of penetration of the resin into the reinforcing structure is controllable such that the resin penetrates a predetermined portion of the thickness of the reinforcing structure, so as to provide acceptable bonding of the resin to the reinforcing structure, while maintaining the flexibility of the reinforcing structure, as well as the permeability to air and water. Still another benefit of the present invention is that it provides a process for reducing the amount of the resinous material required for making the belt.

SUMMARY OF THE INVENTION

A papermaking belt that can be made by a process and an apparatus of the present invention comprises a reinforcing structure and a patterned resinous framework joined thereto. The reinforcing structure has a first side and an opposite second side. The resinous framework has a top side and a bottom side, the top and bottom sides corresponding to the first and second sides of the reinforcing structure, respectively. The resinous framework and the reinforcing structure are joined together such that a substantial portion of the bottom side of the resinous framework is elevated over the second side of the reinforcing structure. That is, the belt has a distance formed between the second side of the reinforcing structure and the substantial portion of the bottom side of the resinous framework. During a papermaking process, this distance provides leakage between the belt and a dewatering papermaking equipment, thereby eliminating a sudden application of fluid pressure differential to a paper web disposed on the belt and mitigating a phenomenon known as "pinholling." The distance between the second side of the reinforcing structure and the bottom side of the resinous framework may differentiate throughout the plane of the belt.

An apparatus for making the papermaking belt comprises a working surface having a pattern of recesses therein, a means for disposing the reinforcing structure in the pattern of recesses of the working surface, a means for applying a fluid resinous material to the reinforcing structure disposed in the recesses of the working surface, and a means for solidifying the fluid resinous material to provide a patterned resinous framework joined to the reinforcing structure. The pattern of recesses is structured and designed to at least partially receive the reinforcing structure therein. In a preferred continuous process, the apparatus further comprises a means for continuously moving the reinforcing structure in a machine direction.

A process for making the belt comprises the following steps. A fluid resinous material is provided. The fluid resinous material is preferably selected from the group consisting of epoxies, silicones, urethanes, polystyrenes, polyolefins, polysulfides, nylons, butadienes, photopolymers, and any combination thereof. In one preferred embodiment the fluid resinous material comprises a photosensitive resin. In another preferred embodiment, the fluid resinous material comprises a thermo-sensitive resin. Preferably, the fluid resinous material is provided in a liquid state.

The next step comprises providing a reinforcing structure having a first side, a second side opposite to the first side, and a thickness defined therebetween. Preferably, a fluid-permeable reinforcing structure is used, such as, for example, a woven reinforcing structure. However, the use of the reinforcing structure that is not fluid-permeable is also contemplated in the present invention. Preferably, the reinforcing structure has voids intermediate its first and second sides, which voids are penetrable by the fluid resinous material.

The next step comprises providing a working surface. The working surface comprises an external surface and a pattern of recesses therein. The recesses have a depth and are structured and designed to receive the reinforcing structure therein.

The next step comprises at least partially disposing the reinforcing structure in the recesses of the working surface. Various means, such as support rolls and press rolls, may be used to facilitate disposing the reinforcing structure in the recesses. Because of the flexible nature of the reinforcing structure, the reinforcing structure can be only partially disposed in the recesses. In some embodiments, the reinforcing structure is disposed in the pattern of recesses to extend beyond the external surface of the working surface. In these instances, it is preferred that at least a portion of the voids penetrable by the fluid resinous material extends beyond the external surface of the working surface.

The next step comprises applying the fluid resinous material to the reinforcing structure. Preferably, the resinous material occupies at least some of the voids in the reinforcing structure such as to "lock on," or "encase," portions of the reinforcing structure as to effectively form a bond therebetween. Alternatively, the resinous material may attach to the reinforcing structure, without locking on around the portions thereof. In the latter case, the first side of the reinforcing structure preferably posses sufficient roughness or/and be adhesive, which can be achieved by special treatment of the reinforcing structure.

The fluid resinous material may be applied to the reinforcing structure in the form of a substantially uniform layer, or—alternatively—according to a predetermined pattern. The former embodiment is particularly relevant for the photosensitive curable resinous materials, while the latter embodiment—for the processes using a patterned molding surface to deposit the resinous material onto the reinforcing structure. In the latter instance, the process further comprises the steps of providing a patterned molding surface juxtaposed with the reinforcing structure, and depositing the fluid resinous material into the molding pockets of the molding surface. The molding surface has a pattern of molding pockets therein, which pockets are structured and designed to receive the fluid resinous material and then to deposit it onto the reinforcing structure. The plurality of molding pockets may comprise a substantially continuous pattern, a pattern of discrete pockets, or a semi-continuous pattern comprising a combination of the substantially continuous pattern and the pattern of discrete pockets. The molding surface may comprise a surface of a rotatable molding roll, or a surface of an endless molding band.

The next step comprises solidifying the fluid resinous material to form a patterned resinous framework joined to the reinforcing structure. The nature of the resinous material dictates a method of its solidifying. Preferably, the solidifying comprises a curing (i. e., a process involving cross-linking) of the resinous material. The photosensitive resinous materials can be cured by a curing, typically UV, radiation. Some thermo-sensitive resinous materials can cure naturally, during a certain period of time. After the resinous material has solidified, it forms a resinous framework securely joined to the reinforcing structure, thus forming the papermaking belt.

DESCRIPTION OF THE DRAWINGS

While the Specification concludes with claims particularly pointing out and distinctly claiming the present invention, the invention will be better understood from the following description taken in conjunction with the associated drawings, in which like elements are designated by the same reference numeral, and:

DETAILED DESCRIPTION OF THE INVENTION

Figure 1:
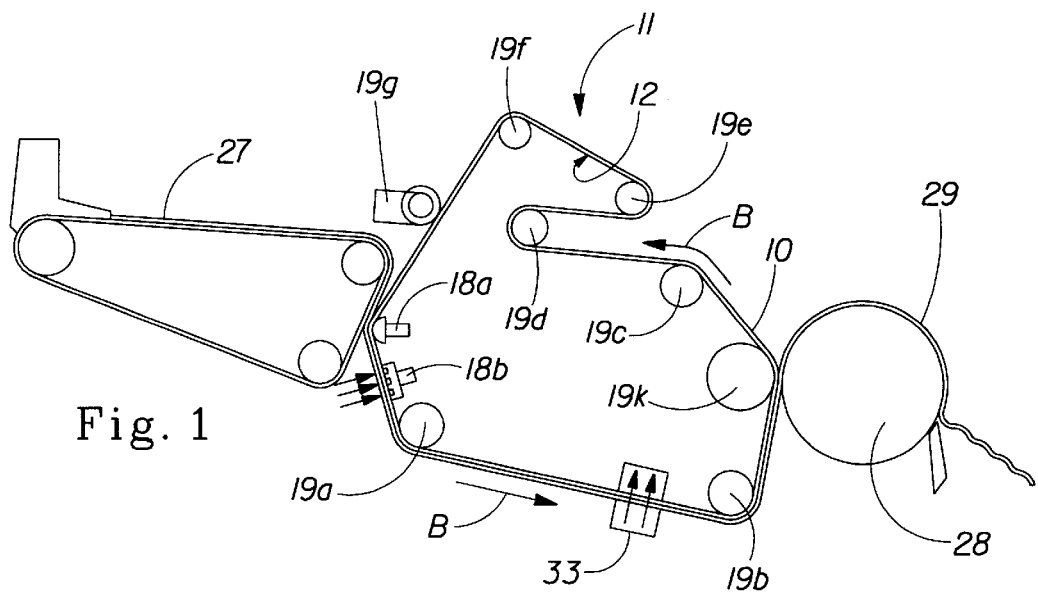
FIG. 1 is a schematic illustration of a process for making a paper web with a papermaking belt made according to present invention.

In the representative papermaking machine schematically illustrated in FIG. 1, the papermaking belt which could be made according to the present invention takes the form of an endless belt, a papermaking belt 10. The papermaking belt 10 has a web-contacting side 11 and a backside 12 opposite to the web-contacting side 11. The papermaking belt 10 carries a paper web (or "fiber web") 27 through various stages of the papermaking process. Processes of forming embryonic webs are described in several references, such as, for example, U.S. Pat. No. 3,301,746, issued to Sanford and Sisson on Jan. 31, 1974; and U.S. Pat. No. 3,994,771 issued to Morgan and Rich on Nov. 30, 1976, both patents are incorporated herein by reference.

The papermaking belt 10 travels in the direction indicated by directional arrow B around the return rows 19a and 19b, impression nip roll 19k, return rolls 19c, 19d, 19e, and 19f, and an emulsion-distributing roll 19g. The loop around which the papermaking belt 10 travels includes a means for applying a fluid pressure differential to the embryonic web 27, such as a vacuum pickup shoe 18a and a multi-slot vacuum box 18b. In FIG. 1, the papermaking belt 10 also travels around a predryer, such as flow-through dryer, 33 and passes through a nip formed between the impression nip roll 19k and a drying drum, such as Yankee drying drum, 28.

Although the preferred embodiment of the papermaking belt 10 is in the form of an endless belt shown in FIG. 1, the belt 10 can be incorporated into numerous other forms which include, for instance, stationary plates for use in making hand sheets, or rotating drums for use with other types of continuous process. Regardless of the physical form which the papermaking belt 10 can take, the belt 10 generally has certain physical characteristics set forth below.

Figure 2:
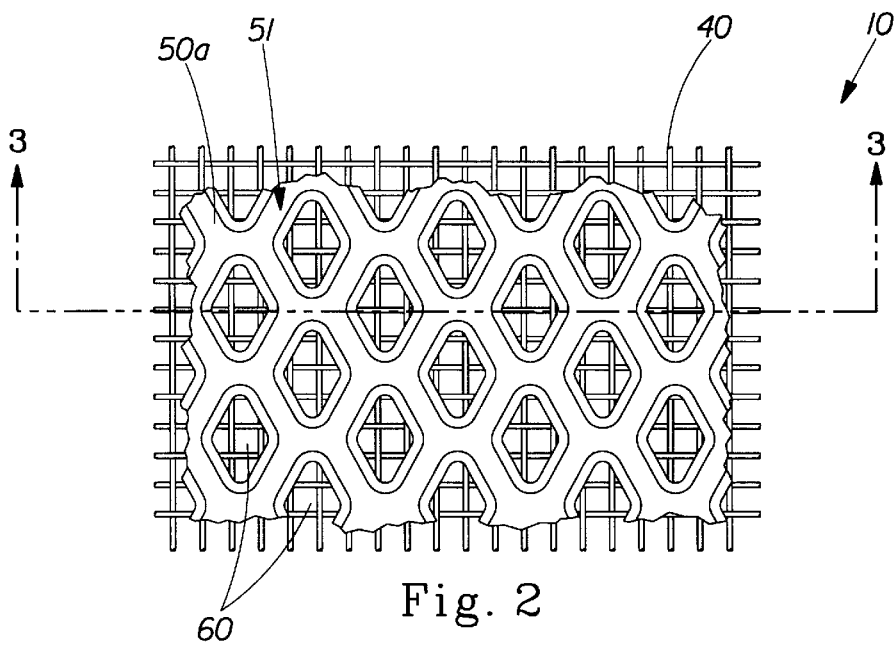
FIG. 2 is a schematic and partial plan view of one exemplary embodiment of the papermaking belt made according to a process of the present invention, the belt including a reinforcing structure and a continuous resinous framework joined to the reinforcing structure.
Figure 3:
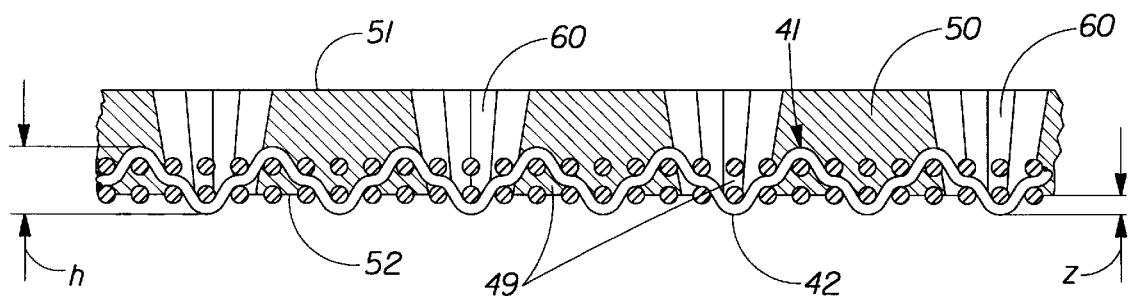
FIG. 3 is a cross-sectional view taken along lines 3—3 of FIG. 2.

As best shown in FIGS. 2 and 3, the belt 10 is essentially macroscopically-monoplanar, and has the web-contacting side 11 and the backside 12 opposite to the web-contacting side 11. The papermaking belt 10 is said to be macroscopically-monoplanar because when a portion of the belt 10 is placed into a planar configuration, the web-contacting side 11, viewed as a whole, is essentially in one plane. It is said to be "essentially" macroscopically mono-planar to recognize the fact that deviations from absolute planarity are tolerable, while not preferred, so long as the deviations are not substantial enough to adversely affect the performance of the belt 10 for the purposes of a particular papermaking process.

The papermaking belt 10 which can be made in accordance with the present invention generally comprises two primarily elements: a framework 50a (preferably, a hardened polymeric resinous framework made of a flowable resinous material 50) and a reinforcing structure 40. The reinforcing structure 40 has a first side 41 and a second side 42 opposite to the first side 41. The first side 41 may contact papermaking fibers during the papermaking process, while the second side 42 typically contacts the papermaking equipment, such as, for example, a vacuum pickup shoe 18a and a multi-slot vacuum box 18b (both shown in FIG. 1).

The reinforcing structure 40 can take any number of different forms. It can comprise a woven element, a non-woven element, a screen, a net, a band, a plate, etc. The preferred reinforcing structure 40 is air-permeable, but it should be understood that air-impermeable reinforcing structure 40 is also contemplated in the present invention. In one preferred embodiment, the reinforcing structure 40 comprises a woven element formed by a plurality of machine-directional yarns interwoven with a plurality of cross-machine directional yarns, as shown in FIGS. 2 and 3. More particularly, the woven reinforcing structure 40 may comprise a foraminous woven element, such as disclosed in commonly-assigned U.S. Pat. No. 5,334,289, issued in the name of Trokhan et al., on Aug. 2, 1994, and incorporated by reference herein. The reinforcing structure 40 comprising a woven element may be formed by one or several layers of the interwoven yarns, the layers being substantially parallel to each other and interconnected in a contacting face-to-face relationship. Commonly-assigned U.S. Pat. No. 5,679,222, issued to Rasch et al. on Oct. 21, 1997 is incorporated by reference herein. Commonly assigned U.S. Pat. No. 5,496,624, issued on Mar. 5, 1996 to Stelljes, Jr. et al., is incorporated herein by reference to show a suitable reinforcing structure 40.

The reinforcing structure 40 of the belt 10 strengthens the resinous framework 50a and preferably has a suitable projected area onto which the papermaking fibers can deflect under pressure. According to the preferred embodiment of the present invention, the reinforcing structure 40 is fluid-permeable. As used herein, the term "fluid permeable" refers to a condition of the reinforcing structure 40, which condition allows fluids, such as water and air, pass through the reinforcing structure 40 in at least one direction. As one skilled in the art will readily recognize, the belts comprising a fluid-permeable reinforcing structures are typically used in through-air-drying processes of making a paper web.

As shown in FIGS. 2 and 3, the reinforcing structure 40 is joined to the resinous framework 50a. The resinous framework 50a comprises a solidified, and preferably cured, resinous material 50, i. e., the resinous framework 50 is a solid phase of the fluid resinous material 50a. In that sense, the terms "resinous material 50" and "resinous framework 50a" may be used interchangeably where appropriate in the context of the present Application. The resinous framework 50a has a top side 51 and a bottom side 52 opposite to the top side 51. One skilled in the art will appreciate that the terms "top" and "bottom" are conventionally used herein for the definition purposes, and in the present context are descriptive only insofar as the belt 10 is illustrated in FIG. 3. During the papermaking process, the top side 51 of the framework 50a contacts the papermaking fibers, thereby defining the pattern of the paper web being produced. In the finished belt 10, the web-contacting side 11 comprises the top side 51 of the resinous framework 50a. In some embodiments, portions of the bottom side 52 of the framework and the second side 42 of the reinforcing structure may be disposed in the same plane. In these instances, the portions of the bottom side 52 of the framework 50a may contact the papermaking equipment. According to the present invention, a substantial portion of the bottom side 52 of the framework 50a does not contact the papermaking equipment. Instead, the substantial portion of the bottom side 52 is elevated over the surface of the papermaking equipment such that a distance Z is formed therebetween, as will be explained in greater detail below. The substantial portion of the bottom side 52 is between the first and second sides 41, 42 of the reinforcing structure 40. The term "substantial portion" refers to a portion of the bottom side 52, which portion is not disposed in the same plane in which the second side 42 of the reinforcing structure 40 is disposed, and a relative size of which portion is defined as a projected area of that portion on the general plane of the belt 10. That is, the substantial portion of the bottom side 52 of the resinous framework 50*a* is elevated (as shown in FIG. 3) over the second side 42 of the reinforcing structure 40, and the distance Z (which may vary) is formed therebetween. Thus, during the papermaking process, the substantial portion of the bottom side of the resinous framework 50*a* does not contact the surface of the papermaking dewatering equipment. The substantial portion of the bottom side 52 (viewed as an area projected to the general plane of the belt 10) is preferably at least about 45%, more preferably at least about 65%, and most preferably at least about 85%, relative to the entire projected area of the bottom side 52. It should be understood that projected areas formed by the yarns of the reinforcing structure 40 are not counted.

It should be understood that the distance Z may differentiate (not shown) between different parts of the finished belt 10. A desirable size of the substantial portion of the bottom side 52 is defined by the relative geometry of the belt 10 and the dewatering equipment, the extent of the distance Z, and other parameters of a particular papermaking process. For a particular belt 10, the substantial portion of the bottom side 52 should be sufficient to provide the leakage between surface of the papermaking equipment creating fluid pressure differential and the backside 12 of the papermaking belt 10.

The desired size of the substantial portion is preferably defined by a desired leakage between the belt 10 and the papermaking equipment providing the fluid pressure differential during the papermaking process. The leakage of at least about 35 Marlatts at pressure differential of 7 inches of Mercury is prefered. A conversion from Marlatts into standard cubic centimeters/minute can be made by inserting the reading measured in Marlatts into the following equation where x is the reading in Marlatts and y is the corresponding value in standard cc/minute:

$$y=36.085+52.583x-0.07685x^2.$$

This equation for converting Marlatts into standard cc/min was developed by calibrating the flow meter to standard cc/min. using a Buck Optical Soap Bubble Meter. The commonly assigned and incorporated herein U.S. Pat. No. 5,334,289 describes in greater detail the test methods and a device utilized to conduct measurements of the leakage (U.S. Pat. No. 5,334,289, at 65:8–68:7). The device described in U.S. Pat. No. 5,334,289 may be utilized to measure the backside texture leakage of the papermaking belt 10 made in accordance with the present invention.

The deflection conduits 60 (FIGS. 2 and 3) extend between the top side 51 and the bottom side 52 of the resinous framework 50. In one preferred embodiment, shown in FIGS. 2 and 3, the plurality of discrete deflection conduits is distributed in a pre-selected non-random pattern throughout the substantially continuous resinous framework 50*a*. The patterns of the conduits' distribution, as well as the conduits' shapes, may vary, as one skilled in the art will understand.

Another embodiment (not shown) of the belt 10 comprises a substantially continuous (as opposed to discrete) conduit 60 encompassing a plurality of discrete portions of the resinous framework 50*a*. In the latter instance, preferably the plurality of the discrete portions of the resinous framework 50*a* comprises a plurality of protuberances extending outwardly from the first side 41 of the reinforcing structure 40 and distributed throughout the substantially continuous conduit 60 in a pre-selected non-random pattern. As used herein, a pattern is said to be "substantially" continuous to indicate that minor deviations from absolute continuity may be tolerated, as long as these deviations do not adversely affect the performance and desired qualities of the final product—the papermaking belt 10. The papermaking belt 10 which comprises a combination of the two foregoing embodiments (i. e., comprising the plurality of discrete conduits and the substantially continuous conduit) is also contemplated in the present invention. Commonly assigned U.S. Pat. No. 5,245,025 issued on Sep. 14, 1993, in the names of Trokhan et al., is incorporated herein by reference.

The framework 50*a* may comprise the bottom side 52 having a network of passageways that provide backside surface texture irregularities, as described in commonly-assigned U.S. Pat. No. 5,275,700 issued on Jan. 4, 1994 to Trokhan, which patent is incorporated by reference herein. The two embodiments of the framework 50*a*—one having the distance Z between the backside 52 of the framework 50*a*, and the other having the backside texture irregularities—beneficially provide leakage between the belt 10 a surface of the papermaking equipment creating the fluid pressure differential. The leakage reduces, and can even eliminate altogether, a suddenness of the application of the vacuum pressure to the paper web, thereby mitigating a phenomenon known as pinholing.

The framework 50*a* which is "angled" relative to the first surface 41 of the reinforcing structure 40 is contemplated in the present invention. As used herein the term "angled" in conjunction with "framework 50*a*" refers to a framework 50*a* in which—if viewed in a cross-section—acute angles are formed between the first surface 41 of the reinforcing structure 40 and longitudinal axes of either discrete deflection conduits—in the instance of the continuous framework 50*a*, or discrete protuberances—in the instance of the framework 50*a* comprising a plurality of discrete protuberances. These embodiments are disclosed in commonly assigned patent applications Ser. No. 08/858,661; and Ser. No. 08/858,662, both applications entitled "Cellulosic Web, Method and Apparatus For Making the Same Using Papermaking Belt Having Angled Cross-sectional Structure, and Method Of Making the Belt," and filed in the name of Larry L. Huston on May 19, 1997, the disclosures of which applications are incorporated herein by reference.

A first step of the process for making a papermaking belt 10 according to the present invention comprises providing a flowable resinous material 50. As used herein, the "flowable resinous material" refers to a wide variety of polymeric resins and the like materials that can achieve and maintain under certain conditions a fluid state sufficient to be deposited onto the reinforcing structure 40 having voids therein and to at least partially penetrate these voids such as the reinforcing structure 40 and the resinous material could be joined together. The flowable resinous material 50 is capable of solidifying under certain conditions, and preferably, the flowable resinous material 50 is capable of being cured. The term "curing" refers to solidification of the fluid resinous material 50*a*, during which solidification cross-linking occurs. The flowable resinous material 50 of the present invention may comprise a material selected from the group consisting of: epoxies, silicones, urethanes, polystyrenes, polyolefins, polysulfides, nylons, butadienes, photopolymers, and any combination thereof.

The examples of the suitable liquid resinous material 50 comprising silicones, include, but are not limited to: "Smooth-Sil 900," "Smooth-Sil 905," "Smooth-Sil 910," and "Smooth-Sil 950." The examples of the suitable liquid resinous material 50 comprising polyurethanes, include, but are not limited to: "CP-103 Supersoft," "Formula 54-290 Soft," "PMC-121/20," "PL-25," "PMC-121/30," "BRUSH-ON 35," "PMC-121/40," "PL-40," "PMC-724," "PMC-744," "PMC-121/50," "BRUSH-ON 50," "64-2 Clear Flex," "PMC-726," "PMC-746," "A60," "PMC-770," "PMC-780," "PMC-790." All the above exemplary materials are commercially available from Smooth-On, Inc., 2000 St. John Street, Easton, Pa., 18042. Other examples of the liquid resinous material 50 include multi-component materials, such as, for example, a two-component liquid plastic "Smooth-Cast 300," and a liquid rubber compound "Clear Flex 50," both commercially available from Smooth-On, Inc.

Figure 4:
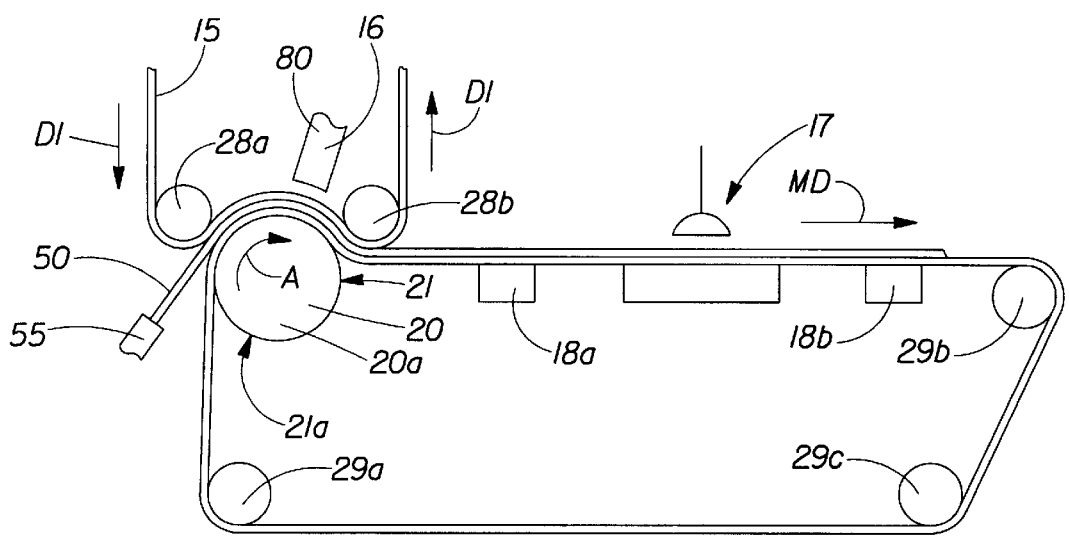
FIG. 4 is a schematic side elevational view illustrating one embodiment of the process and the apparatus according to the present invention for making a papermaking belt comprising a curable photosensitive resinous material.

Photosensitive resins may also be used as the resinous material 50. One exemplary embodiment of the process using the photosensitive resin as the resinous material 50 is shown in FIG. 4. The photosensitive resins are usually polymers that cure, or cross-link, under the influence of radiation, typically ultraviolet (UV) light. References containing more information on liquid photosensitive resins include Green et al., "Photocross-Linkage Resin Systems," J. Macro-Sci. Revs Macro Chem. C21 (2), 187–273 (1981–82); Bayer, "A Review of Ultraviolet Curing Technology", Tappi Paper Synthetics Conf. Proc., Sep. 25–27, 1978, pp. 167–172; and Schmidle, "Ultraviolet Curable Flexible Coatings", J. of Coated Fabrics, 8, 10–20 (July, 1978). All the preceding three references are incorporated herein by reference. Especially preferred liquid photosensitive resins are included in the Merigraph series of resins made by Hercules Incorporated, Wilmington, Del. A most preferred resin is Merigraph resin EPD 1616.

The examples of thermo-sensitive resins that can comprise the resinous material 50 of the present invention include, but are not limited to: a group of thermoplastic elastomers Hytrel® (such as Hytrel® 4056, Hytrel®7246, and Hytrel®8238); and Nylon Zytel® (such as Zytel®101L, and Zytel®132F), commercially available from DuPont Corporation of Wilmington, Del.

Preferably, the flowable resinous material 50 is provided in a liquid form. The present invention, however, contemplates the use of the flowable resinous material 50 which is provided in a solid form. In the latter instance, an additional step of fluidizing the resinous material 50 is required. The flowable resinous material 50 is preferably supplied to a source 55 which provides for the proper conditions (such as, for example, temperature) to keep the resinous material 50 in a fluid state. As used herein, the term "fluid" refers to a condition, state, or phase, of the resinous material 50, in which condition the resinous material 50 is capable of flowing and which allows the resinous material 50 be deposited onto a three-dimensionally-patterned surface such that the resinous material 50 substantially conforms to a three-dimensional pattern of the patterned surface. If thermoplastic or thermosetting resins are used as the resinous material 50, typically, a temperature slightly above the melting point of the material is desired to maintain the resin in a fluid state. The material is considered to be at or above the "melting point" if the material is wholly in the fluid state. A suitable source 55 is a trough schematically shown in several drawings of the present application. The trough may have a closed end bottom and closed side walls and outboard side wall. The inboard side wall of the trough may be open allowing the flowable resinous material 50 disposed therein to freely contact and communicate with a molding member 70 (FIG. 5), as described herein below. If the resinous material comprises a thermoplastic resin, the source 55 and the molding member 70 is preferably heated to prevent premature solidification of the liquid resinous material 50.

Figure 5:
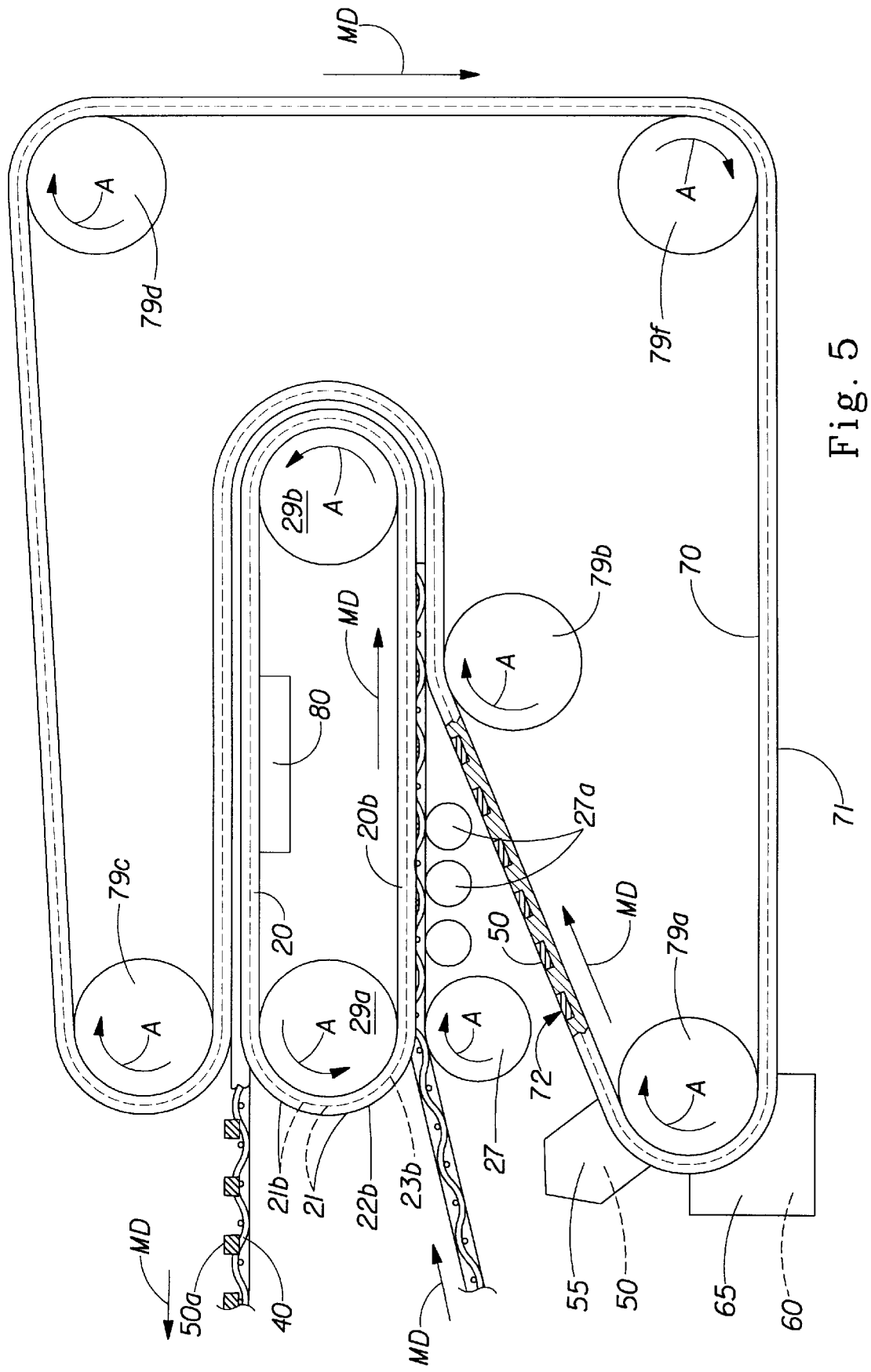
FIG. 5 is a schematic side elevational view illustrating another embodiment of the process and the apparatus according to the present invention for making a papermaking belt, the apparatus comprising a molding member.

In the embodiment of the process of the present invention, shown in FIG. 5, a suitable source 55 is a trough. The trough may have a closed end bottom and closed side walls and outboard side wall. The inboard side wall of the trough may be open allowing the flowable resinous material 50 disposed therein to freely contact and communicate with a molding member 70, as described herein below. In the embodiment of the process shown in FIG. 4, a coating of the flowable resinous material 50 is applied to the reinforcing structure 40 by the source comprising a nozzle.

The second step of the process according to the present invention comprises providing a reinforcing structure 40. As has been explained above, the reinforcing structure 40 is a substrate that may comprise a variety of different forms, such as, for example, a woven fabric, a screen, a band, etc. A more detailed description of the reinforcing structure 40, particularly one comprising a woven element, may be found in commonly-assigned U.S. Pat. No. 5,275,700 incorporated herein by reference. In the formed papermaking belt 10, the first side 41 faces (and in some embodiment may contact) the papermaking fibers during the papermaking process, while the second side 42, opposite to the first side 41, faces (and typically contacts) the papermaking equipment. As used herein, the first side 41 and the second side 42 of the reinforcing structure 40 are consistently referred to by these respective names regardless of incorporation (i. e., prior, during, and after the incorporation) of the reinforcing structure 40 into the papermaking belt 10.

A distance between the first side 41 and the second side 42 of the reinforcing structure 40 defines its thickness and is designated herein as "h" (FIG. 3). According to the present invention, the preferred reinforcing structure 40 has voids 49 intermediate the first side 41 and the second side 42, as shown in FIG. 3. In the reinforcing structure 40 comprising a woven element (as shown in FIG. 3), the voids 49 may be a natural occurrence of a weave pattern. The voids 49 are such that the fluid resinous material 50 is capable of penetrating the voids 49 so that the resinous material 50 and the reinforcing structure 50 are securely joined together after the resinous material 50 has solidified and transformed into the resinous framework 50a. That is, the combination of viscosity of the fluid resinous material 50 and dimensions and shapes of the voids 49 preferably allows the fluid resinous material 50 to penetrate the voids 49 and to "lock on" around at least some portions of the reinforcing structure 40 such as to effectively form a "bond" with the reinforcing structure 40.

While the reinforcing structure 40 having voids 49 therein is preferred, the present invention contemplates the use of the reinforcing structure having no such voids, or having the voids which are not penetrable by the liquid resinous material 50. In this instance, the reinforcing structure 40, especially its first side 41, is such that the resinous material 50 can attach thereto to sufficiently join the reinforcing structure 40. For this purpose, the reinforcing structure 40, especially its first side 41, preferably has a sufficient roughness, either inherently, or as a result of a special treatment. Alternatively or additionally, the first side 41 of the reinforcing structure can be treated with a suitable adhesive to cause the attachment of the resinous material 50 to the reinforcing structure 40.

In the preferred continuous process of the present invention, the reinforcing structure 40 continuously moves in a machine direction, indicated in several figures as "MD." The use of the term "machine direction" herein is consistent with the traditional use of the term in papermaking, where this term refers to a direction which is parallel to the flow of the paper web through the papermaking equipment. As used herein, the "machine direction" is a direction parallel to the flow of the reinforcing structure 40 during the process of the present invention. Any means known in the art and suitable for a given process may be used to provide the continuous movement of the reinforcing structure 40. Because some types of the resinous material 50 require a relatively longer time to solidify compared to a "pot time," i. e., the time during which the resinous material 50 can be maintained in a liquid state, the movement of the reinforcing structure 40 may be indexed, if desired, such that the belt 10 is constructed portion-by-portion, as one skilled in the art will readily recognize.

The next step comprises providing a working surface 21. As used herein, the term "working surface" refers to a surface of a working member 20, structured and designed to provide support for the reinforcing structure 40 when the reinforcing structure 40 receives the flowable resinous material 50 thereon. The working member 20 may comprise various structures. FIG. 4 shows the working member 20 in the form of a rotatable roll 20a rotating in a direction indicated by a directional arrow "A," while in FIG. 5 the working member 20 comprises an endless band 20b traveling in the machine direction MD.

Figure 4A:
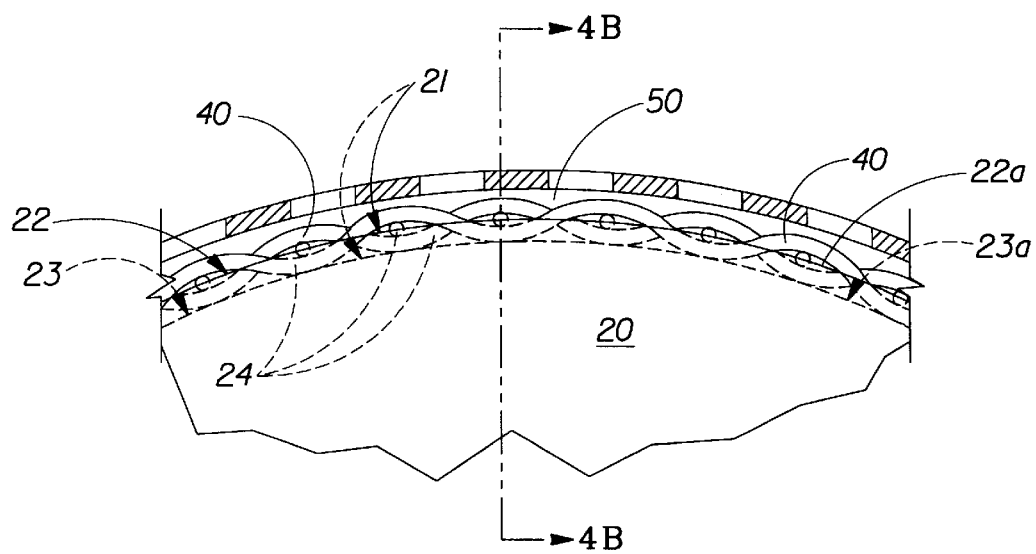
FIG. 4A is a schematic cross-sectional view taken along lines 4A—4A of FIG. 4.
Figure 4B:
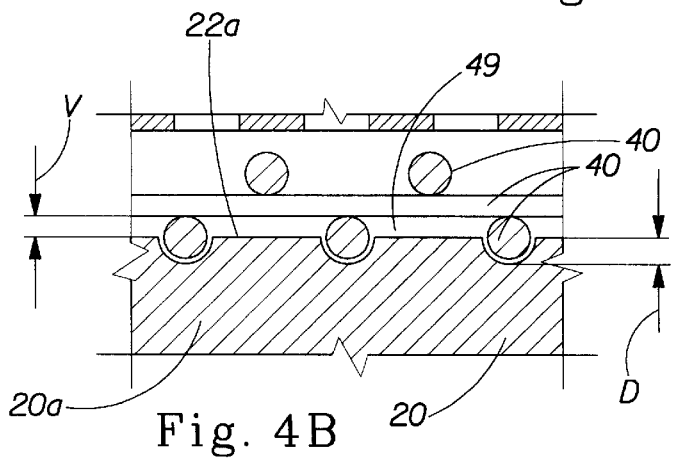
FIG. 4B is a schematic cross-sectional view taken along lines 4B—4B of FIG. 4A.
Figure 4C:
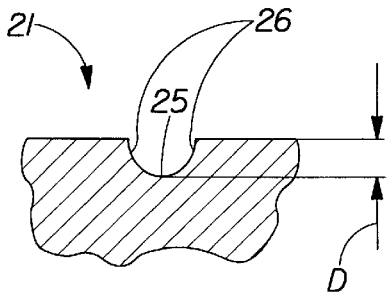
FIG. 4C is a schematic and more detailed cross-sectional view of an element of the pattern of recesses of the working surface, shown in FIG. 4B.

Regardless of a specific embodiment of the working member 20, the working surface 21 posses certain characteristics, in accordance with the present invention. Most importantly, FIGS. 4A and 4B show that the working surface 21 has a pattern of recesses 24 therein capable to receive the reinforcing structure 40 therein. The pattern of recesses 49 is structured and designed such that the reinforcing structure 40 can be at least partially recessed in the recesses 24, as best shown in FIG. 4B. The recesses 49 may be formed by any means known in the art, such as, for example, engraving, molding, extrusion, etc. As used herein, the "working surface" 21 is a generic term referring to all exposed surfaces in contact with the reinforcing structure 40, including an external (or the most elevated) surface 22 and a surface(s) of the recesses 24. The recesses 24 are conventionally said to have a "bottom" 25 and "walls" 26, as schematically shown in FIG. 4C. In FIG. 4A, the working surface 21a comprises an external surface 22a (or a surface corresponding to a greater diameter of the roll 20a) and inner surfaces 23a of the recesses 24. In FIG. 5, the working surface 21b comprises an external surface 22b and inner surfaces 23b of the recesses 24 in the band 20b. It is said that the reinforcing structure 40 is "at least partially" recessed in the pattern of recesses 24 to recognize that because of the flexibility of the reinforcing structure 40, in some embodiments, portions of the reinforcing structure 40 may not be completely recessed within the recesses 24, which may be tolerable as long as it does not adversely affect the process and the final product of the present invention.

According to the present invention, the recesses 24 have at least one depth "D" (FIGS. 4B and 4C) which is preferably less than the thickness h of the reinforcing structure 40.

The difference between the thickness h of the reinforcing structure 40 and the depth D of the recesses 24 ensures that the reinforcing structure 40 extends beyond (or "above" with reference to FIG. 4B) the working surface 21. Preferably, the reinforcing structure extends beyond the external surface 22 of the working surface 21 such that at least a portion of the voids 49 penetrable by the fluid resinous material 50 also extend beyond the external surface 22 of the working surface 20, as best shown in FIG. 4B. For illustration only, in FIG. 4B, a symbol "V" schematically designates a "vertical" dimension of one type of the voids 49 between one of the yarns of the woven reinforcing structure 40 and the external surface 22a of the working surface 21a. That is, if the reinforcing structure 40 comprises a woven element, preferably a clearance exists between at least the uppermost yarn of the reinforcing structure 40 and the external surface 22 of the working surface 21, as best shown in FIGS. 4A and 4B. If desired, the recesses 49 may have differential depths.

It should be understood that while the embodiment in which the depth D of the recesses 49 is less than the thickness h of the reinforcing structure 40 is preferred, it is not necessary. In the present invention embodiments are contemplated, in which the depth D of the recesses 49 is equal to or even greater than the thickness h of the reinforcing structure 40, as will be explained below in greater detail.

The next step in the process of the present invention comprises depositing the reinforcing structure 40 in the recesses 49 of the working surface 20. Any means known in the art may be used for this step. In FIG. 5, a press roll 27 and a plurality of support rolls 27a facilitate registering of the reinforcing structure 40 within the recesses 24 of the working surface 21a. The process of the present invention may be indexed such as to allow one to register a portion of the reinforcing structure 40 which contacts the working surface 20, then move the working surface 21 having the portion of the reinforcing structure 40 recessed therein to the next location, where the fluid resinous material 50 is applied to the reinforcing structure 40, and then the process is repeated. This embodiment is not specifically illustrated but can be easily visualized by one skilled in the art based on the several drawings of the present Application.

The next step comprises applying the fluid resinous material 50 to the reinforcing structure 40. Depending on a specific embodiment of the process of the present invention, the fluid resinous material 50 may be applied using a variety of means. In the embodiment of FIG. 4, the fluid resinous material 50 is applied to the reinforcing structure 40 by the nozzle 55 forming a layer of the fluid resinous material 50. In this instance, it is highly preferred that the resinous material 50 be evenly applied across the width of the reinforcing structure 40, thereby forming a substantially uniform layer of the resinous material contacting the reinforcing structure 40. In FIG. 4, the reinforcing structure 40 travels in the machine direction MD up, over, and about the rotatable roll 20a, and return rolls 29a, 29b, and 29c. Thickness of the resinous material 50 applied to the reinforcing structure 40 may be controlled to a pre-selected value, depending on an expected use of the belt 10 being constructed. Any suitable means for controlling the thickness can be used. For example, in FIG. 4, a roll 28a is juxtaposed with the working member 20 comprising the roll 20a to form a nip therebetween. A clearance between the roll 28a and the working surface 21a of the roll 20a can be controlled mechanically by means not shown.

If the resinous material 50 is selected from photosensitive resins, a mask 15 can be used in juxtaposition with the layer of the resinous material 50, to shield certain areas of the liquid photosensitive resin from exposure to curing radiation, as described in commonly assigned U.S. Pat. Nos. 4,514,345; and 5,275,700, incorporated herein by reference and referred to above. In FIG. 4, the mask, preferably comprising an endless loop, travels in the direction indicated by directional arrows D1 about rolls 28a and 28b. In the embodiment shown in FIG. 4, the control of the thickness of the resinous material 50 applied to the reinforcing structure 40 and the juxtaposition of the mask 15 relative to the resinous material 50 occur simultaneously.

FIG. 5 shows the embodiment of the process of the present invention, in which the fluid resinous material 50 is applied to the reinforcing structure 40 by a molding member 70. As used herein, the "molding member" 70 is a patterned structure designed to first, receive the fluid resinous material 50 thereby forming a predetermined pattern of the resinous material 50 therein, and then transfer the resinous material 50 onto the reinforcing structure in a predetermined pattern. In the preferred continuous process, the molding member 70 may comprise a variety of different embodiments. In the embodiment shown in FIG. 5, the molding member 70 comprises an endless band, a portion of which travels in juxtaposition with the reinforcing structure 40 and the working surface 20. One skilled in the art will understand, however, that the molding member 70 may comprise a rotatable roll (not shown). Regardless of its embodiment, the molding member 70 comprises a molding surface 71 having a three-dimensional pattern thereon. The molding surface 71 is a surface onto/into which the fluid resinous material 50 is deposited. The molding surface 71 is structured and designed to receive the flowable resinous material 50 such that the flowable resinous material 50 substantially conforms to the three-dimensional pattern of the molding surface 71. Preferably the molding surface 71 comprises a pre-selected pattern of molding pockets 72 therein. In a preferred continuous process of the present invention, the molding member 70 continuously moves at a transport velocity thereby carrying the resinous material 50 therein. One skilled in the art will readily appreciate that in the embodiments comprising the rotatable molding roll or rolls, the transport velocity comprises a surface velocity measured at the circumferences of the molding surface. In the embodiment of FIG. 5, comprising the molding member 70 in the form of the endless band, the transport velocity is a velocity of the band.

As used herein, the "molding pockets" 72 refers to a pattern of depressions, or cavities, in the molding surface 71, which are designed to receive therein the fluid resinous material 50 from a source 55, and then to transfer the fluid resinous material 50 to the reinforcing structure 40 such as to deposit the fluid resinous material 50 onto the reinforcing structure 40 in a pre-determined pattern. The molding pockets 72 may comprise a substantially continuous pattern in the molding surface 71; in this instance, the resinous material 50 is transferred onto the reinforcing structure 40 in a substantially continuous pattern to form a substantially continuous resinous framework 50a, as described above. Alternatively, the molding pockets 72 may comprise a pattern of discrete depressions, or cavities. In the latter instance, the resinous material 50 is transferred from the molding pockets 72 to the reinforcing structure 40 in a pattern comprising a plurality of discrete protuberances, as described above. A pattern (not shown) comprising a combination of the substantially continuous molding pockets and the discrete molding pockets (i. e., a so-called "semi-continuous" pattern) is also contemplated by the present invention.

The framework 50a which is "angled" relative to the first surface 41 of the reinforcing structure 40 is contemplated in the present invention. As used herein the term "angled" framework 50a refers to a framework 50a in which—if viewed in a cross-section—acute angles are formed between the first surface 41 of the reinforcing structure 40 and longitudinal axes of either discrete deflection conduits—in the instance of the continuous framework 50a, or discrete protuberances—in the instance of the framework 50a comprising a plurality of discrete protuberances. These embodiments are disclosed in commonly assigned patent applications Ser. No. 08/858,661, and Ser. No. 08/858,662, both applications entitled "Cellulosic Web, Method and Apparatus For Making the Same Using Papermaking Belt Having Angled Cross-sectional Structure, and Method Of Making the Belt," and filed in the name of Larry L. Huston on May 19, 1997, the disclosures of which applications are incorporated herein by reference.

The molding pockets 72 have at least one depth. In the embodiment shown in FIG. 5, the depth of the molding pockets 72 generally defines a thickness of the resinous material 50 deposited from the molding pockets 72 onto the reinforcing structure 40. As used herein, the term "depth" of the molding pocket(s) 72 indicates an extent of the geometrically-distinct depression(s) into the molding member 70. Virtually an unlimited number of shapes and their permutations of the molding pockets 72 having differential depths may be used in the present invention. "Angled" configurations of the molding pockets 72 may be used to produce the "angled" pattern of the resinous framework 50a, as explained herein above. The embodiment of the process of the process invention illustrated in the FIG. 5 allows one advantageously to create almost any desired shape of the resinous framework 90 by providing the correspondingly-shaped molding surface 71.

The pattern of the molding pockets 72 may be made by any method known in the art, including, but not limited to, engraving, and molding/casting. The molding surface 71 may be constructed by using an existing papermaking belt 10 having a desirable pattern of the resinous framework 50a. In this instance, the belt 10 is used as a template, onto which a suitable mold material may be applied to form, after its solidification, a molding surface 71. That, this molding surface 71 can be attached to the molding member 70 by any suitable means known in the art. Of course, where applicable, the entire molding member may be constructed as described herein above. One example of mold materials that may be used is, but is not limited to: "Brush-On 50," commercially available from Smooth-On, Inc.

In FIG. 5, the flowable resinous material 50 is deposited into the molding pockets 72 of the molding surface 71 by, generally, first contacting the molding surface 71 with the flowable resinous material 50, and then removing excess of the resinous material 50 from the molding surface 71 as the molding surface 71 is moving. Preferably, the excess of the flowable resinous material 50 is removed into the source (trough in FIG. 5) 55, thereby reducing, or even eliminating, waste of the resinous material 50. Any suitable depositing means known in the art may be used in the apparatus 10 of the present invention to perform this step. Removing of the excess of the resinous material 50 from the molding surface 71 may be accomplished by wiping and/or scraping the excess material from the molding surface 71.

In FIG. 5, the step of applying the fluid resinous material 50 to the reinforcing structure 40 comprises continuously transporting the reinforcing structure 40 at the transport velocity such that a portion of the reinforcing structure 40 is in a face-to-face relationship with a portion of the molding surface 71, and transferring the flowable resinous material 50 from the molding pockets 72 of the molding surface 71 onto the reinforcing structure 40 in the pre-selected pattern. If desired, the molding pockets 72 can be treated with a release agent 60 prior to the step of depositing the resinous material 50 into the molding pockets 72, to facilitate the transferal of the resinous material 50 from the molding pockets 72 onto the reinforcing structure 40.

In FIG. 5, the working member 20, comprising the band 20b, travels in the machine direction MD about support rolls 29a and 29b rotating in the direction indicated by the directional arrow "A." The reinforcing structure 40 comes into contact with the working surface 71 and gets recessed within the working surface 21 at a nip formed between the support roll 29a and a press roll 27. In FIG. 5, the reinforcing structure 40 is also supported by rolls 27a. The molding member 70 travels around support rolls 79a, 79b, 29b, 79c, 79d, and 79f. The reinforcing structure 40 comes into a face-to-face relationship with the molding surface at a nip formed between the support roll 79b and the band 20b. Starting at this point, the corresponding portions of the reinforcing structure 40 recessed within the working surface 21 and the molding surface 71 travel in a face-to-face, preferably contacting, relationship during a pre-determined period of time sufficient to cause the resinous material 50 to be transferred from the molding pockets 72 of the molding surface 71 onto the reinforcing structure 40 and at least partially solidify such as to retain the shape after the molding surface 71 has disassociated from the reinforcing structure. In the embodiment of FIG. 5, the transferal of the resinous material 50 from the molding surface 71 to the reinforcing structure 40 is advantageously facilitated by gravitation, for at some point, the molding surface 71 is above the reinforcing structure 40. It should be understood that the resinous material 50 can partially solidify while associated with the molding surface 71 and before the resinous material 50 gets transferred from the molding surface 71 to the reinforcing structure 40. In some embodiments, a change of the viscosity of the resinous material 50 is contemplated, prior to its deposition onto the reinforcing structure 40. However, as has been pointed out above, the resinous material 50 should retain viscosity sufficient to allow the resinous material 50 and the reinforcing structure 40 join together.

Preferably, the portion of the reinforcing structure 40 facing the molding surface 71 contacts the molding surface 71 for a predetermined period of time. The process using the molding surface 71, principally illustrated in FIG. 5, is described in greater detail in commonly-assigned and co-pending application titled "Papermaking Belt and Process for Making the Same," filed in the name of Ampulski on the same date as the present Application has been filed, which Application is incorporated herein by reference.

Regardless of a specific method of applying the resinous material 50 to the reinforcing structure 40, in the preferred embodiment the fluid resinous material 50 has the viscosity allowing the fluid resinous material 50 to penetrate at least a portion of the voids 49 of the reinforcing structure 40. According to the present invention, a portion of the fluid resinous material 50 must work its way beyond the first side 41 of the reinforcing structure 40 to reach the voids 49 such as to at least partially encase, or "lock on," portions of the reinforcing structure 40 and to form thereby a secure bond between the resinous framework 50a and reinforcing structure 40 in the finished belt 10.

In the preferred embodiment, in which the reinforcing structure 40 comprises a woven element, the resinous material 50 must at least partially encase the yarns comprising the first surface 41 to form a secure joining therebetween. In the embodiment in which a portion of the voids 49 extends beyond the external surface 22 of the working member 20, the fluid resinous material 50 easily fills the exposed voids 49, thereby encasing the corresponding portions of the reinforcing structure 40. It is believed, however, that in the embodiments in which the thickness h of the reinforcing structure 40 is equal to or even less than the depth D of the recesses 49, the viscosity of the fluid resinous material 50 could be selected such as to allow the resinous material 50 to partially penetrate into the recesses 24, thereby filling the voids 49. Because of the woven nature of the reinforcing structure 40, some empty spaces exist between the yarns of the reinforcing structure 40 and the walls of the recesses 24. Therefore, given a sufficient viscosity of the fluid resinous material 50, the fluid resinous material 50 can penetrate between the yarns of the reinforcing structure 40 and the walls of the recesses 24, as well as between the individual interwoven yarns of the reinforcing structure 40.

In the embodiments of FIGS. 4B–5, in which portions of the voids 49 penetrable by the fluid resinous material 50 extend beyond the external surface 22 of the working member 20, a substantial portion of the fluid resinous material 50 is not able to reach beyond the external surface 22 of the working surface 20. Therefore, after the resinous material 50 has solidified, a distance Z is created between the second side 42 of reinforcing structure 40 and the bottom side 51a of the resinous framework 50a. Of course, relatively small amounts of the fluid resinous material 50 may still, in some embodiments, penetrate between the individual yarns of the reinforcing structure 40 and between the yarns of the reinforcing structure 40 and the walls of the recesses 24, and even reach a "bottom" of the recesses 49. One skilled in the art will understand that because of such a penetration of the fluid resinous material 50 into the recesses between the yarns of the reinforcing structure 40 and/or the walls of the recesses 49, the distance Z may differentiate throughout the plane of the belt 10 being constructed, which is acceptable as long as the average distance Z is sufficient to provide leakage between the belt 10 and the vacuum equipment and to eliminate the sudden application of vacuum pressure to the web disposed on the belt 10, as has been explained above.

The next step in the process of the present invention comprising solidifying the fluid resinous material 50. As used herein, the term "solidification" and derivations thereof refer to a process of altering a fluid to a solid state. Typically, solidification involves a phase change, from a liquid phase to a solid phase. The term "curing" refers to a solidification in which cross-linking occurs. Preferably, the solidification of the resinous material 50 comprises curing. A method of solidifying the resinous material 50 depends upon its nature. For example, photosensitive resins may be cured by UV radiation, as described in commonly assigned U.S. Pat. Nos. 5,334,289; 5,275,700; 5,364,504; 5,098,522; 5,674,663; and 5,629,052, all of which are incorporated herein by reference. The thermo-plastic and thermo-setting resins require a certain temperature for solidification. The resinous material 50 comprising multi-component resins or plastics solidify naturally, during a certain predetermined period of time, by virtue of being mixed together.

In some embodiments the process of solidification of the resinous material 50 may begin as early as right after the fluid resinous material 50 has been deposited onto the molding surface 71, FIG. 5. Preferably, solidification continues while the reinforcing structure 40 and the molding surface 71 are in face-to-face relationship. As an example, FIG. 5 schematically shows a curing device 80 juxtaposed with the surface opposite to the working surface 21b of the band 20b. One skilled in the art will understand that, depending on the nature of the resinous material 50 and the method of its solidifying, the curing device 80 may be located in other locations. The examples of the curing device 79 include, but are not limited to: a heater for increasing cross-linking reaction rates or condensing rates for condensing polymers; a cooler for solidifying thermoplastics; various apparatuses providing an infra-red curing radiation, a microwave curing radiation, or an ultra-violet curing radiation; and the like.

In the exemplary embodiment of FIG. 4, the photosensitive resinous material 50 is cured by exposing it to curing radiation, i. e., the light of activating wavelength through the mask, thereby inducing curing of the resinous material 50 in those portions that are not shielded by the non-transparent regions of the mask 15. A curing device 80, including a source of curing radiation 16, may comprise an exposure lamp providing illumination primarily within the wavelength which causes curing of the liquid photosensitive resin 50. Any suitable source of illumination, such as mercury arc, pulsed xenon, electrodeless and fluorescent lamps, can be used. Commonly assigned patent application, Ser. No. 08/799,852, entitled "Apparatus for Generating Parallel Radiation For Curing Photosensitive Resin" filed in the name of Trokhan on Feb. 13, 1997; and commonly assigned patent application, Ser. No. 08/858,334, entitled "Apparatus for Generating Controlled Radiation For Curing Photosensitive Resin" filed in the names of Trokhan et al. on Feb. 13, 1997, and its continuation Ser. No. 08/958,540 filed on Oct. 24, 1997 are incorporated herein by reference for the purpose of showing several embodiments of the apparatus for curing radiation 16 which can be used for solidifying the resinous material 50 comprising a photosensitive resin.

In the embodiment of FIG. 4, a step may be preferred of removing from the reinforcing structure 40 substantially all of the uncured resinous material 50, i. e., that resinous material 50 which was shielded by the non-transparent regions of the mask 15 from exposure to the curing radiation. A vacuum may be applied from a vacuum apparatus 18a to a composite of reinforcing structure 40 and partly cured resinous material 50 to remove a substantial quantity of the liquid (i. e., uncured) resinous material 50 from the composite. Then, a shower 17 may be used to wash out remains of the uncured resinous material 50 from the composite. Then, the vacuum may once again be applied, from a vacuum apparatus 18b, to remove any residual liquid resinous material 50 and shower liquid. Optionally, there can be a second exposure (not shown) of the resinous material 50 to the curing radiation to complete the curing of the resinous material 50 and to increase the hardness and durability of the resinous framework 50a of the belt 10 being constructed. The process continues until the entire length of the reinforcing structure 40 has been treated and converted into the belt 10.

The thermo-sensitive resinous material 50 may be solidified naturally, at a room temperature. In the embodiment shown in FIG. 5, the step of solidifying the fluid resinous material 50a may be provided by maintaining the resinous material 50 associated with the reinforcing structure 40 and the patterned molding surface 71 for a pre-determined period of time. During this time, the resinous material 50 solidifies sufficiently to be able to retain its desired shape after it has been disassociated from the molding surface 70. In the embodiment of FIG. 5, the process of solidification of the resinous material 50 may begin right after the fluid resinous material 50 has been deposited onto the molding surface 71. Solidification continues while the reinforcing structure 40 and the molding surface 71 are in a face-to-face relationship, beginning at the nip formed between the support roll 79b and the band 20b. From this point on, the corresponding portions of the reinforcing structure 40 recessed within the working surface 21 and the molding surface 71 travel in a face-to-face relationship during a pre-determined period of time sufficient to cause the resinous material 50 to be transferred from the molding pockets 72 of the molding surface 71 onto the reinforcing structure 40 and at least partially solidify such as to retain the shape after the molding surface 71 has disassociated from the reinforcing structure.

Optionally, solidification accelerators may be used to speed up the process of solidification of the resinous material 50. As used herein, "solidification accelerators" refers to materials that, when added to the resinous material 50, shorten the time necessary to solidify, and preferably cure, the resinous material 50. Such solidification accelerators preferably should not adversely affect the ultimate physical properties of the resinous framework 50a being constructed. The examples of the solidification accelerator include, but are not limited to: "SO-CURE Cure Accelerator" ("C-1506," "C-1508," "C-1509," and "C-1511"; and "KICK-IT Cure Accelerator" ("PMC-724," "PMC-726," "PMC-121/30," "PMC-121/50," "PMC-744," "PMC-780," all commercially available from Smooth-On, Inc., 2000 St. John Street, Easton, Pa., 18042.

Optionally, a step of controlling the caliper of the belt 10 may be provided in the process of the present invention. The caliper may be controlled by controlling the depth of recesses 24 in the working surface 21. Another way of controlling the caliper comprises changing the thickness of the resinous material 50 after the resinous material 50 has sufficiently joined the reinforcing structure 40, and after the resinous framework 50a has been at least partially formed. For example, the thickness of the resinous material 50 can be adjusted by mechanical means known in the art, and therefore not shown herein. For example a couple of mutually-juxtaposed rolls forming a nip therebetween may be used for controlling the caliper of the belt 10. By adjusting a nip clearance between the rolls, one can control the caliper of the belt 10 being constructed. Alternatively or additionally, the caliper-controlling device may comprise a rotating sanding roll, a planing knife, a laser, or other means known in the art and suitable for the purpose of controlling the caliper of the belt 10.

What is claimed is:

1. A process for making a papermaking belt comprising a reinforcing structure and a resinous framework joined thereto, the process comprising the steps of:

(a) providing a fluid resinous material;

(b) providing a reinforcing structure having a first side, a second side opposite to the first side, and a thickness defined therebetween;

(c) providing a working surface comprising an external surface and a pattern of recesses therein, the pattern of recesses having a depth and being structured and designed to receive the reinforcing structure therein;

(d) at least partially disposing the reinforcing structure in the recesses of the working surface;

(e) applying the fluid resinous material to the reinforcing structure; and (f) solidifying the fluid resinous material to form a patterned resinous framework joined to the reinforcing structure.

2. The process according to claim 1, wherein in the step (b) the reinforcing structure has voids intermediate the first side and the second side, the voids being penetrable by the fluid resinous material.

3. The process according to claim 2, wherein in step (e) the resinous material occupies at least some of the voids in the reinforcing structure.

4. The process according to claim 3, wherein in the step (d) the reinforcing structure is disposed in the pattern of recesses to extend beyond the external surface of the working surface.

5. The process according to claim 4, wherein a portion of the voids penetrable by the fluid resinous material extends beyond the external surface of the working surface.

6. The process according to claim 1, wherein the reinforcing structure comprises a woven element.

7. The process according to claim 2, wherein the fluid resinous material is selected from the group consisting of epoxies, silicones, urethanes, polystyrenes, polyolefins, polysulfides, nylons, butadienes, photopolymers, and any combination thereof.

8. The process according to claim 7, wherein the fluid resinous material comprises a photosensitive resin.

9. The process according to claim 7, wherein the fluid resinous material comprises a thermo-sensitive resin.

10. The process according to claim 1, wherein in the step (e) the fluid resinous material is applied to the reinforcing structure in a pre-selected non-random pattern.

11. The process according to claim 1, further comprising the steps of:

providing a patterned molding surface juxtaposed with the reinforcing structure, the molding surface having a pattern of molding pockets therein; and depositing the fluid resinous material into the molding pockets of the molding surface.

12. The process according to claim 1, further comprising the step of substantially changing a viscosity of at least some of the fluid resinous material applied to the reinforcing structure before the step of solidifying the fluid resinous material.

13. A process for making a papermaking belt comprising a reinforcing structure and a resinous framework joined thereto, the process comprising the steps of:

(a) providing a fluid resinous material;

(b) providing a reinforcing structure comprising at least one plurality of machine-directional yarns interwoven with at least one plurality of cross-machine-directional yarns, the reinforcing structure having a first side, a second side opposite to the first side, a thickness defined therebetween, and voids intermediate the first and second sides, the voids being penetrable by the fluid resinous material;

(c) providing a working surface comprising an external surface and a pattern of recesses therein, the pattern of recesses having a depth less than the thickness of the reinforcing structure, the pattern of recesses being structured and designed to receive the reinforcing structure therein;

(d) disposing the reinforcing structure in the recesses such that a portion of the voids penetrable by the fluid resinous material extends beyond the external surface of the working surface;

(e) applying the fluid resinous material to the reinforcing structure to occupy at least some of the voids in the reinforcing structure; and (f) solidifying the fluid resinous material to form a patterned resinous framework joined to the reinforcing structure.

\* \* \* \* \*